(12) United States Patent
Renkonen

(10) Patent No.: US 6,910,469 B2
(45) Date of Patent: Jun. 28, 2005

(54) INLET AIR ARRANGEMENT FOR PISTON ENGINE

(75) Inventor: Jari Renkonen, Kuusisto (FI)

(73) Assignee: Wartsila Technology Oy AB, Helsinki (FI)

( * ) Notice: Subject to any disclaimer, the term of this patent is extended or adjusted under 35 U.S.C. 154(b) by 0 days.

(21) Appl. No.: 10/345,683

(22) Filed: Jan. 15, 2003

(65) Prior Publication Data

US 2003/0131831 A1 Jul. 17, 2003

(30) Foreign Application Priority Data

Jan. 17, 2002 (FI) .............................................. 20020087

(51) Int. Cl.$^7$ ........................... F02B 29/04; F02B 33/00
(52) U.S. Cl. ........................... 123/563; 165/51; 165/146
(58) Field of Search ............................ 123/563, 559.1; 60/599; 165/51, 146; 417/423; F02B 29/04

(56) References Cited

U.S. PATENT DOCUMENTS

| | | | | |
|---|---|---|---|---|
| 3,584,682 A | * | 6/1971 | Leedham et al. | ............ 165/164 |
| 4,476,842 A | * | 10/1984 | Belsanti | ...................... 123/563 |
| 4,562,697 A | | 1/1986 | Lawson | ....................... 123/563 |
| 5,931,219 A | * | 8/1999 | Kull et al. | ..................... 165/51 |

FOREIGN PATENT DOCUMENTS

| | | | | |
|---|---|---|---|---|
| DE | 2 059 220 | | 6/1972 | .......... F02B/29/04 |
| DE | 2105657 B | * | 6/1979 | .......... F02B/29/04 |
| DE | 19639422 A1 | * | 9/1997 | .......... F02B/29/04 |
| FR | 2423634 A | * | 12/1979 | .......... F02B/29/04 |
| FR | 2 645 209 | | 10/1990 | .......... F02B/29/04 |
| GB | 1 033 181 | | 10/1966 | .......... F02B/29/04 |
| JP | 08210133 A | * | 8/1996 | .......... F02B/29/04 |
| JP | 2001248448 A | * | 9/2001 | .......... F02B/29/04 |
| JP | 2002115609 A | * | 4/2002 | .......... F02B/29/04 |
| JP | 2003097277 A | * | 4/2003 | .......... F02B/29/04 |
| JP | 2004027901 A | * | 1/2004 | .......... F02B/29/04 |
| WO | 00/40844 | | 7/2000 | .............. 123/559.1 |

* cited by examiner

Primary Examiner—Thai-Ba Trieu
(74) Attorney, Agent, or Firm—John Smith-Hill; Smith-Hill and Bedell

(57) ABSTRACT

A supercharged multi-cylinder piston engine includes an elongate air inlet manifold and multiple heat transfer elements located in the interior space of the air inlet manifold. The heat transfer elements extend individually over different respective length segments of the interior space of the manifold and extend collectively over substantially the entire length of the interior space of the manifold.

15 Claims, 3 Drawing Sheets

US 6,910,469 B2

INLET AIR ARRANGEMENT FOR PISTON ENGINE

BACKGROUND OF THE INVENTION

The invention relates to an inlet air arrangement for a piston engine.

It has been proposed to use a suction air intercooler after a supercharger apparatus, especially in a supercharged engine, for intensifying operation. By cooling the air, the density of the air increases and thus for a given volume flow rate the mass flow rate of the air increases and a greater mass of oxygen is provided for the combustion process. Typically this has been implemented in such a way that suction or intake air is led from the supercharger apparatus to a separate intercooler, in which the air is cooled. From the intercooler, air is led further along the suction air channel to a suction air chamber defined by an air intake manifold, which is attached to the engine and extends over substantially the entire length of the engine. Air is led from the suction air chamber to the combustion cylinders through separate channels.

Publications U.S. Pat. Nos. 3881455 and 3091228 have proposed solutions in which the need of space of the engine can be reduced by integrating the intercooler with the suction air chamber. However, these solutions are defective in so far as neither the suction air flow nor its cooling is uniform.

An objective of the invention is to provide a piston engine suction air arrangement, which minimizes the problems of the prior art. A specific objective of the invention is to provide a piston engine suction air arrangement, by which the cooling and feeding of the suction air is controlled and adequate especially in large engines.

SUMMARY OF THE INVENTION

The suction air arrangement of a piston engine embodying the invention comprises a supercharger apparatus, a suction air collector chamber, a feeding channel, which is in communication with the supercharger apparatus and with the first end of the collector chamber. Further, the arrangement comprises for each engine cylinder a connecting channel, which connects the cylinder and the collector chamber, as well as a suction air heat transfer apparatus located in the suction air collector chamber. The heat transfer apparatus comprises several heat transfer elements in the collector chamber located throughout substantially the entire inside length thereof. Furthermore, the functioning of each heat transfer element is separately adjustable and controllable.

The piston engine comprises several cylinders arranged inline and the suction air collector chamber extends over substantially the entire length of the line of cylinders. The heat transfer apparatus divides the suction air collector chamber substantially into an upstream part in communication with the feeding channel and a downstream part in communication with the connecting channels.

The heat transfer elements at the opposite ends of the collector chamber have been advantageously arranged so that their heat transfer efficiency is different. This way, the decrease of the suction air temperature is obtained as desired. To further this, each heat transfer element of the heat transfer apparatus includes two portions that are connected in two different flow circuits, in which the heat transfer media are at different temperature levels. The two portions of the heat transfer element are positioned so that one portion of the heat transfer element bounds or limits the upstream part of the collector chamber and the other portion of the heat transfer element bounds or limits the downstream part of the collector chamber. Additionally or alternatively, the heat transfer elements at the opposite ends of the collector chamber can be arranged in such a way that their air side flow resistance is different.

A heat transfer apparatus support arrangement, which makes possible the controlled moving of each heat transfer element to the desired position thereof from the other end of the collector chamber, extends over substantially the entire inside length of the collector chamber. The support arrangement is formed of two guides, and each heat transfer element comprises on two opposite sides thereof a guiding arrangement counter member, with the cooperation of which the heat transfer element is movable along the guides.

Each heat transfer element has its own flow circuit fittings, which are detachable from the heat transfer element. Because of this, when the flow circuit fittings are detached, the heat transfer element can be displaced along the guides.

BRIEF DESCRIPTION OF THE DRAWINGS

In the following, the invention will be described, by way of example, with reference to the accompanying drawings, in which.

DETAILED DESCRIPTION

Figure 1:
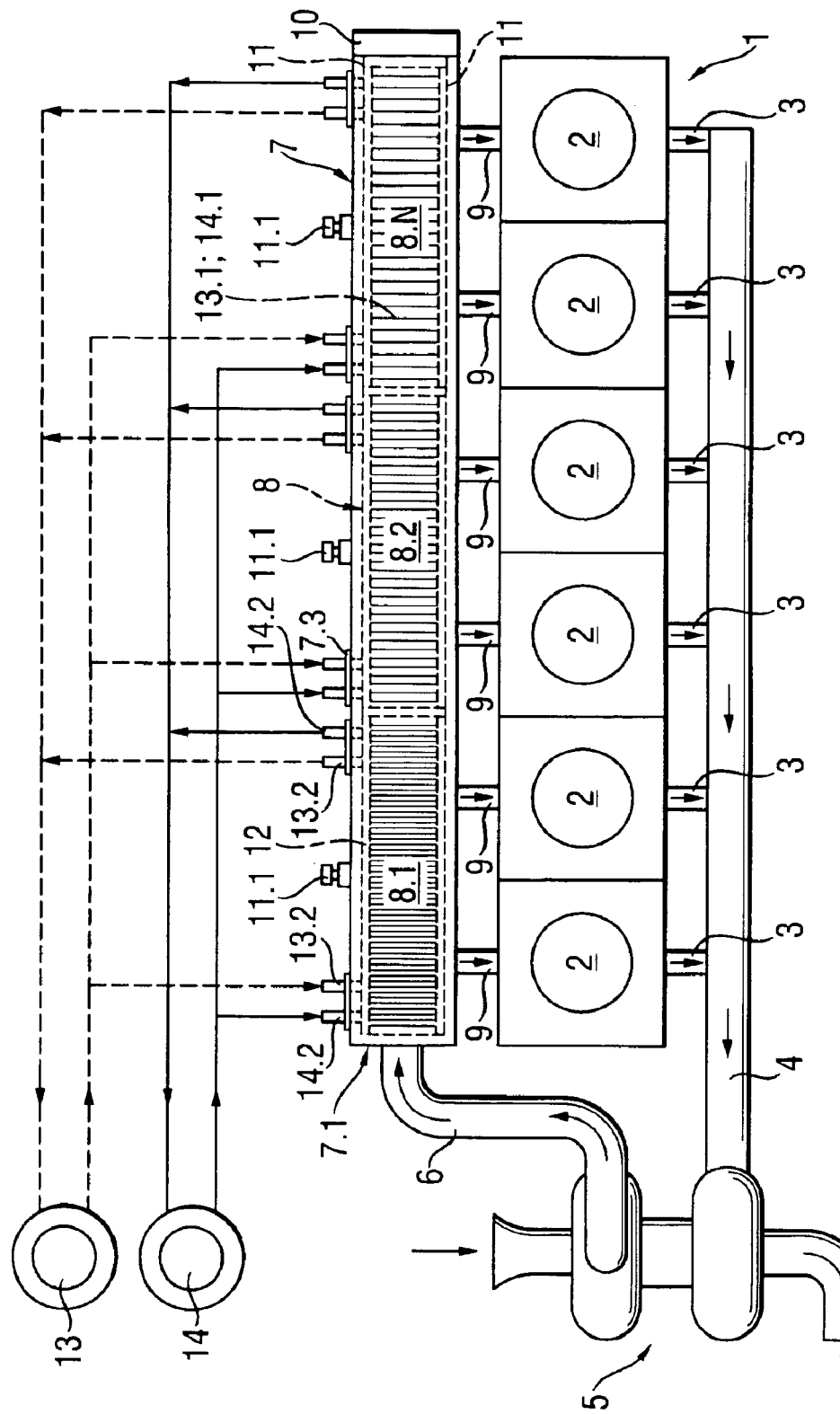
FIG. 1 shows schematically one embodiment of the piston engine suction air arrangement according to the invention.

In FIG. 1, the reference numeral 1 denotes the supercharged piston engine. The engine comprises several combustion cylinders 2 arranged inline. An exhaust gas channel 3 extends from each cylinder to the exhaust manifold 4, which is connected to the turbine of the turbocharger 5. When the engine is running, suction or feed air flows to the turbocharger 5 compressor, which compresses the feed air. As a result, the temperature of the air rises. From the turbocharger 5 suction air is led to the feeding channel 6, which connects the supercharger apparatus 5 to the collector chamber or air inlet manifold 7. In the collector chamber 7, there is arranged a heat transfer apparatus 8, by which suction air can be e.g. cooled. The collector chamber is connected to the engine cylinders 2 by connecting channels 9 leading to the cylinders respectively.

The heat transfer apparatus 8 comprises several separate heat transfer elements 8.1, 8.2 . . . 8.N installed in the collector chamber 7 in its longitudinal direction over substantially the entire inside length thereof, so that the frontal or upstream face of the heat transfer apparatus is substantially parallel with the longitudinal axis of the collector chamber. The feeding channel 6 is connected to the end of the collector chamber and opens to the first part 7.1 of the collector chamber 7, which is upstream of the heat transfer apparatus in the flow direction of the suction air, that is to say, below the heat transfer apparatus in FIGS. 2 and 3. The first part 7.1 is bounded by the first or upstream frontal face of each individual heat transfer element. In the collector chamber 7 there is a heat transfer apparatus fastening arrangement, which comprises guides 11 extending over substantially the entire inside length of the collector chamber 7. The fastening arrangement allows the guided movement of each heat transfer element 8.1 ... 8.N to the desired final position thereof from the other end of the collector chamber and securing of each heat transfer element in its desired final position. At the end of the collector chamber 7, there is a removable end piece 10, by which the collector chamber can be closed.

The guides 11 extend along opposite walls of the collector chamber. The heat transfer elements can be moved along the guides and are supported by the guides. Each heat transfer element includes counter members 12, by which the heat transfer element engages the guides 11 in a manner allowing movement of the heat transfer element along the guides. Thus, if required, the heat transfer elements may be removed and reinstalled by opening the end piece 10, moving each heat transfer element along the guides 11 to its correct position and closing the end piece. The heat transfer elements 8.1–8.N are arranged end-to-end between the two longitudinal ends of the collector chamber so that the combustion air flows over their heat transfer surfaces sequentially when passing from the first part 7.1 of the chamber to the second part 7.2 of the chamber. After moving the heat transfer elements to their desired operating positions, the heat transfer elements may be fastened in position and connected to the-flow circuits. The heat transfer elements are advantageously secured against movement along the guides by fastening devices 11.1 installed in the guide 11. A screw or equivalent, accessible from outside the collector chamber 7, can be used for this purpose.

Figure 2:
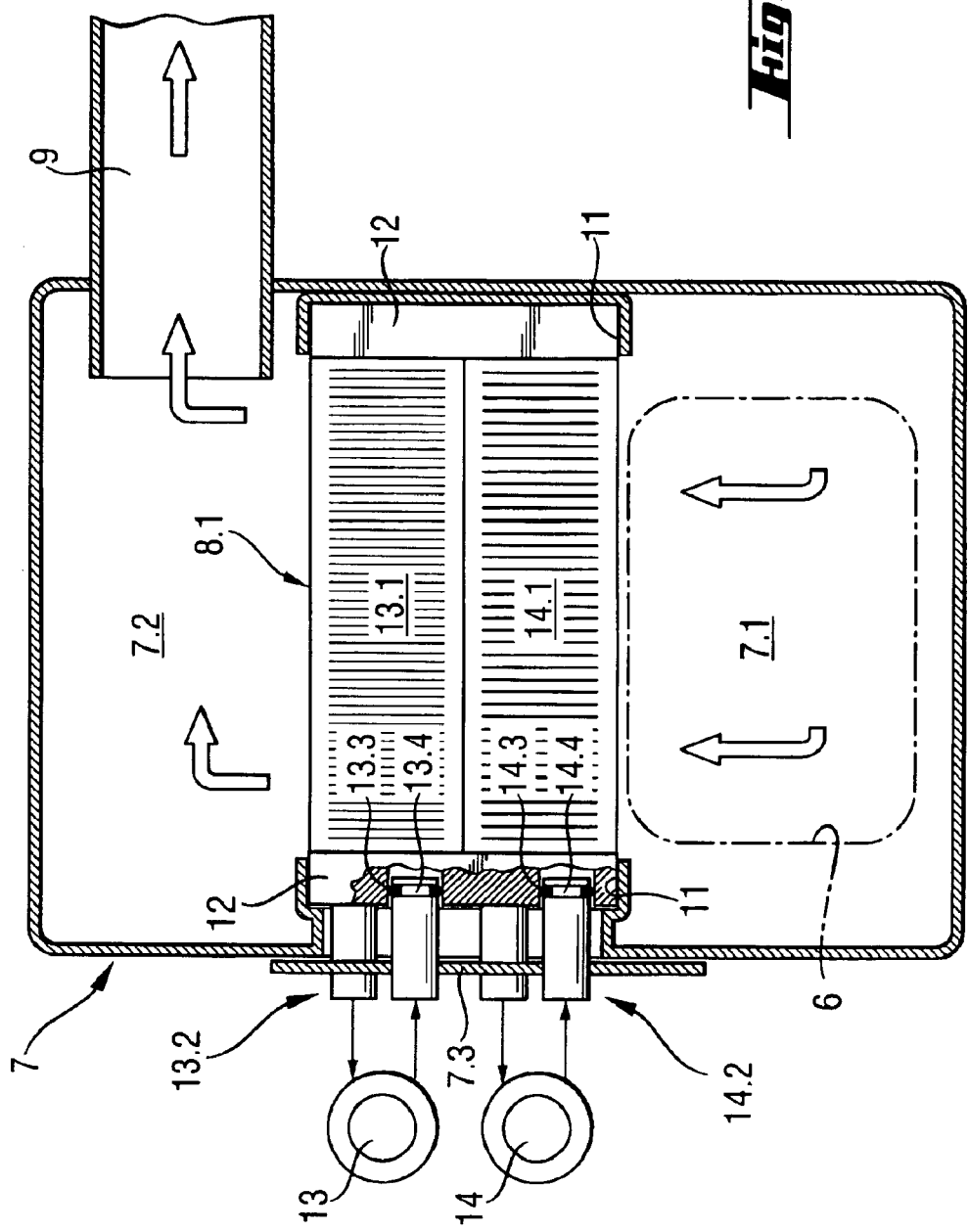
FIG. 2 shows schematically the cross section of the suction air collector chamber close to the first end.
Figure 3:
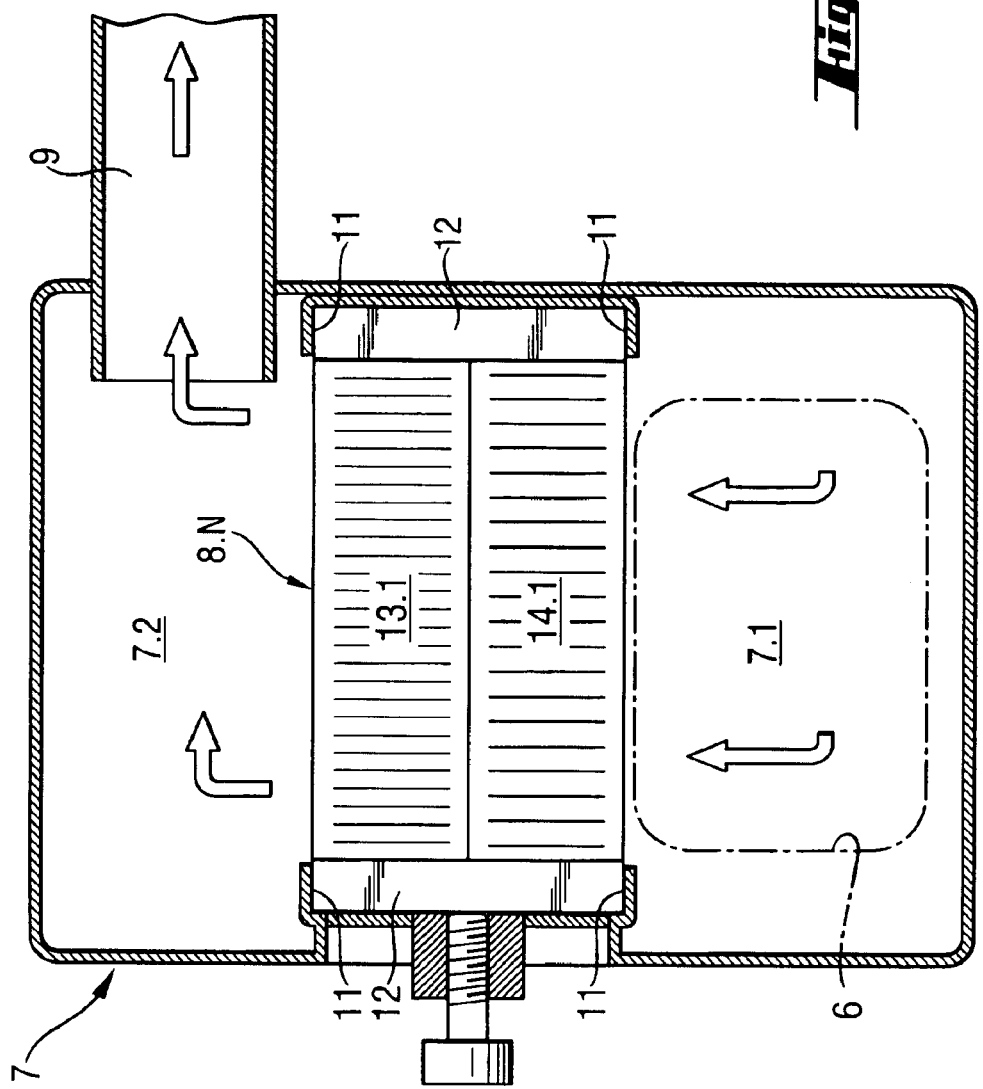
FIG. 3 shows schematically the cross section of the suction air collector chamber near to the second end.

FIG. 2 shows the cross section of the collector chamber 7 near to its first longitudinal end and FIG. 3 shows a similar view at a location near to the opposite longitudinal end. For bringing the air temperature to a suitable level for each cylinder, the heat transfer elements 8.1 and 8.N at the opposite ends of the collector chamber are of different heat transfer efficiency. Furthermore, the heat transfer elements 8.1 and 8.N at the opposite ends of the collector chamber are of different air side flow resistance for guiding the flow more uniformly through the heat transfer arrangement 8. In this way the need for separate air deflector arrangements can be minimized.

The heat transfer efficiency of a heat transfer element can be influenced in a manner known per se by selecting suitable heat transfer properties, these properties being, among other things, surface area, fins and material. Also, the flow resistance of the heat transfer elements can be influenced in a manner known per se, for example by selecting the desired flow surface area, form or properties of the surface.

The suction air arrangement comprises two separate heat transfer circuits 13 and 14, which operate at different temperature levels. Similarly, each heat transfer element 8.1 ... 8.N comprises two separate heat transfer circuit segments 13.1 and 14.1, which are located so that one circuit segment 14.1 restricts the first part 7.1 and the other circuit segment 13.1 restricts the second part 7.2 of the collector chamber. When combustion air is cooled, the flow circuits are advantageously connected in such a way that air flows first through the circuit segment 14.1 operating at a higher temperature level and after that through the circuit segment 13.1 operating at a lower temperature level.

Each heat transfer element is connected to the heat transfer circuits 13, 14 with flow circuit fittings 13.2, 14.2. The fittings 13.2, 14.2 themselves advantageously include short pipes or the like provided with grooves 13.4, 14.4 for O-ring seals 13.3, 14.3. The short pipe may be engaged with the heat transfer element by insertion into a bore with proper diameter for a leak proof seal. Engagement of the fittings 13.2, 14.2 with the heat transfer element does not require that any formations should projection from the heat transfer element, and consequently the longitudinal surface that is provided with the bores for receiving the short pipes is flat, which facilitates displacement of the heat transfer elements along the guides 11 after disengagement of the fittings. The collector chamber 7 may be sealed to be substantially gas tight and the fittings may be fastened to the collector chamber by means of flange-like elements 7.3.

The invention is not limited to the embodiments shown but several modifications are feasible within the scope of the attached claims.

What is claimed is:

1. A multi-cylinder piston engine comprising:
   a supercharger apparatus,
   an elongate air inlet manifold having first and second longitudinally opposite ends and defining an elongate interior space,
   an elongate guide structure located within the air inlet manifold,
   a feed air duct connecting the supercharger apparatus with the air inlet manifold at the first longitudinal end thereof,
   connecting ducts connecting the air inlet manifold to the cylinders respectively,
   at least two heat transfer elements located in the interior space of the air inlet manifold and supported by the elongate guide structure in a manner allowing movement of the heat transfer elements longitudinally of the air inlet manifold, the heat transfer elements extending individually over different respective length segments of said interior space and extending colletively over substantially the entire length of said interior space,
   ducting defining a heat transfer circuit, and
   fittings connected to the ducting and releasably engaged with at least one heat transfer element for connecting said one heat transfer element to the heat transfer circuit.

2. A multi-cylinder piston engine according to claim 1, wherein the multiple cylinders are arranged inline, the air inlet manifold extends over substantially the entire length of the cylinder line, and the heat transfer elements divide the air inlet manifold into an upstream part connected to the feed air duct and a downstream part connected to the connecting ducts.

3. A multi-cylinder piston engine according to claim 1, wherein the heat transfer elements include heat transfer elements that are located at opposite respective ends of the air inlet manifold and of different heat transfer efficiency.

4. A multi-cylinder piston engine according to claim 1, wherein the heat transfer elements include heat transfer elements that are located at opposite respective ends of the air inlet manifold and are of different air side flow resistance.

5. A multi-cylinder piston engine according to claim 1, wherein the heat transfer elements include heat transfer elements that are located at opposite respective ends of the air inlet manifold and are of different heat transfer efficiency and of different air side flow resistance.

6. A multi-cylinder piston engine according to claim 1, wherein the elongate guide structure extends over substantially the entire length of the air inlet manifold, and wherein the heat transfer elements are engaged with the guide structure in a manner allowing controlled and guided movement of the heat transfer elements lengthwise of the air inlet manifold.

7. A multi-cylinder piston engine according to claim 6, wherein the air inlet manifold has a removable end cap at one end allowing access to the heat transfer elements, whereby a heat transfer element insertable is into the air inlet manifold by way of said one end thereof and moved along the air inlet manifold, guided by the guide structure, to an operating position.

8. A multi-cylinder piston engine according to claim 6, wherein the guide structure comprises two guide members extending lengthwise of the air inlet manifold and each heat transfer element comprises two counter members for engaging the guide members respectively, whereby cooperation of the counter members and the guide members allows guided movement of the heat transfer element lengthwise of the air inlet manifold.

9. A multi-cylinder piston engine according to claim 1, wherein each heat transfer element is composed of a first part that bounds an upstream part of said interior space and a second part that bounds a downstream part of said interior space, and wherein the first and second parts of the heat transfer element include two duct segments for connection to respective heat transfer circuits.

10. A multi-cylinder piston engine according to claim 1, wherein each heat transfer element comprises flow circuit fittings which are detachable from the heat transfer element to allow movement thereof lengthwise of the air inlet manifold.

11. A multi-cylinder piston engine according to claim 1, wherein the ducting defines first and second heat transfer circuits, each heat transfer element is composed of a first part that bounds an upstream part of said interior space and a second part that bounds a downstream part of said interior space, and the first and second parts of the heat transfer element include two duct segments connected to the first and second heat transfer circuits respectively.

12. A multi-cylinder piston engine according to claim 11, wherein the first and second heat transfer circuits each include a flow duct and a return duct, and the fittings include at least two fittings connected to the flow and return ducts respectively of the first heat transfer circuit and releasably engaged with the first part of the heat transfer element and at least two fittings connected to the flow and return ducts respectively of the second heat transfer circuit and releasably engaged with the second part of the heat transfer element.

13. A multi-cylinder piston engine according to claim 1, wherein the ducting includes a flow duct and a return duct, and the fittings include at least two fittings connected to the flow duct and releasably engaged with the heat transfer elements respectively and at least two fittings connected to the return duct and releasably engaged with the heat transfer elements respectively, whereby the heat transfer elements are connected in parallel between the flow duct and the return duct.

14. A multi-cylinder piston engine according to claim 1, wherein the heat transfer elements divide the air inlet manifold into an upstream part connected to the feed air duct and a downstream part connected to the connecting ducts and the connecting ducts are spaced apart lengthwise of the air inlet manifold.

15. A multi-cylinder piston engine according to claim 1, wherein each heat transfer element has two opposite ends and the heat transfer elements are located in the interior space of the air inlet manifold in end-to-end relationship.

* * * * *

UNITED STATES PATENT AND TRADEMARK OFFICE
CERTIFICATE OF CORRECTION

PATENT NO. : 6,910,469 B2
DATED : June 28, 2005
INVENTOR(S) : Jari Renkonen

It is certified that error appears in the above-identified patent and that said Letters Patent is hereby corrected as shown below:

Column 4,
Line 32, "colletively" should be deleted and replaced with -- collectively --.
Line 49, "and of" should be deleted and replaced with -- and are of --.

Column 5,
Line 2, "insertable is" should be deleted and replaced with -- is insertable --.

Signed and Sealed this

Thirtieth Day of August, 2005

JON W. DUDAS
*Director of the United States Patent and Trademark Office*